United States Patent
Braun et al.

(10) Patent No.: US 8,458,472 B2
(45) Date of Patent: Jun. 4, 2013

(54) AUTHENTICATION METHOD AND COMMUNICATIONS SYSTEM USED FOR AUTHENTICATION

(75) Inventors: Michael Braun, München (DE); Erwin Hess, Ottobrunn (DE); Anton Kargl, München (DE); Bernd Meyer, München (DE)

(73) Assignee: Siemens Aktiengesellschaft, Munich (DE)

( * ) Notice: Subject to any disclaimer, the term of this patent is extended or adjusted under 35 U.S.C. 154(b) by 582 days.

(21) Appl. No.: 12/311,440

(22) PCT Filed: Sep. 26, 2007

(86) PCT No.: PCT/EP2007/060221
§ 371 (c)(1),
(2), (4) Date: Mar. 30, 2009

(87) PCT Pub. No.: WO2008/037742
PCT Pub. Date: Apr. 3, 2008

(65) Prior Publication Data
US 2009/0235073 A1    Sep. 17, 2009

(30) Foreign Application Priority Data

Sep. 29, 2006 (DE) .......... 10 2006 046 215
Dec. 21, 2006 (DE) .......... 10 2006 060 760

(51) Int. Cl.
*H04L 29/06* (2006.01)
(52) U.S. Cl.
USPC ........... 713/169; 713/168; 713/170; 713/171; 713/172; 380/227
(58) Field of Classification Search
USPC .... 713/169, 176, 168, 170, 171, 172; 380/30, 380/227; 702/150
See application file for complete search history.

(56) References Cited

U.S. PATENT DOCUMENTS 6,526,509 B1 * 2/2003 Horn et al. .......... 713/171
6,950,933 B1 * 9/2005 Cook et al. .......... 713/158
(Continued)

FOREIGN PATENT DOCUMENTS

DE    10161138 A1    7/2003
DE    10161137 A1    10/2003
(Continued)

OTHER PUBLICATIONS

Udo et al, Fully Integrated Passive UHF RFID Transponder IC with 16.7-uW Minimum RF Input Power, Oct. 2003.*

(Continued)

*Primary Examiner* — Andy Rao
*Assistant Examiner* — Shan Elahi
(74) *Attorney, Agent, or Firm* — Staas & Halsey LLP

(57) ABSTRACT

An authentication method authenticates between subscribers of a communications system using an asymmetric elliptic curve encryption algorithm. The method involves providing a first and at least one second subscriber having a first or second secret key known only to the respective subscriber and a public key; authenticating an inquiry transmitted by the first subscriber with respect to the validity of the first certificate contained therein and associated with the first subscriber; calculating the response of the second subscriber associated with the inquiry; randomized encryption of the calculated response and a second certificate associated with the second subscriber using the public key; decryption and authentication of the response transmitted by the second subscriber with respect to the validity of the second certificate contained therein.

24 Claims, 5 Drawing Sheets

U.S. PATENT DOCUMENTS

| | | | |
|---|---|---|---|
| 6,952,475 B1 * | 10/2005 | Horn et al. | 380/30 |
| 7,095,851 B1 * | 8/2006 | Scheidt | 380/44 |
| 7,215,773 B1 | 5/2007 | Johnson | |
| 7,451,307 B2 * | 11/2008 | Matsushima | 713/156 |
| 7,639,808 B2 * | 12/2009 | Izu et al. | 380/255 |
| 2001/0014153 A1 | 8/2001 | Johnson | |
| 2002/0166048 A1 | 11/2002 | Coulier | |
| 2004/0199768 A1 * | 10/2004 | Nail | 713/169 |
| 2004/0250073 A1 * | 12/2004 | Cukier et al. | 713/171 |
| 2005/0108539 A1 * | 5/2005 | Skog et al. | 713/176 |
| 2005/0193012 A1 | 9/2005 | Matsuyama et al. | |
| 2005/0270567 A1 | 12/2005 | Du et al. | |
| 2006/0093138 A1 * | 5/2006 | Durand et al. | 380/44 |
| 2006/0155992 A1 * | 7/2006 | Omori et al. | 713/169 |
| 2007/0211729 A1 * | 9/2007 | Yoshiba et al. | 370/395.52 |
| 2008/0130614 A1 * | 6/2008 | Hummelholm et al. | 370/343 |
| 2008/0229104 A1 * | 9/2008 | Ju et al. | 713/169 |

FOREIGN PATENT DOCUMENTS

| | | | |
|---|---|---|---|
| EP | 1675300 A1 * | 6/2006 | |
| GB | 2321741 A | 8/1998 | |
| JP | 2-44389 | 2/1990 | |
| JP | 4-117826 | 4/1992 | |
| JP | 4-129441 | 4/1992 | |
| JP | 2001-520483 | 10/2001 | |
| JP | 2002-330125 | 11/2002 | |
| JP | 2002-344438 | 11/2002 | |
| JP | 2003-132253 | 5/2003 | |
| JP | 2003-216411 | 7/2003 | |
| JP | 2004-159100 | 6/2004 | |
| JP | 2005-122484 | 5/2005 | |
| WO | WO 9637064 A1 | 11/1996 | |
| WO | WO 2006061670 A1 * | 6/2006 | |
| WO | WO 2006086518 A2 * | 8/2006 | |

OTHER PUBLICATIONS

Miguel Morales et al, On the Hardware Design of an Ellptic Curve Cryptosystem, Sep. 2004.*

Kay Seemann et al, The System Design of Integrated Passive Transponder Devices, Dec. 2006.*

Adnan et al, High Radix Parallel Architecture for GF(P) Elliptic Curve Processor, Apr. 2003.*

Sarma et al, RFID Systems and Security and Privacy Implication, 2003.*

Aziz et al, A secure communications protocol to prevent unauthorized access, 1994.*

Cohen et al, A new side channel resistant scalar point multiplication method for binary elliptic curves, Oct. 2006.*

Bajard et al, An RNS Montgomery modular multiplication algorithm, Jul. 1998.*

Moon et al, Elliptic curve scalar mulitplication using radix-4 booth's algorithm, Oct. 2004.*

Schneier, Applied Cryptography 2nd edition, 1996 (p. 31-p. 33).*

McIvor et al, FPGA Montgomery Modular Multiplicaiton Architectures Suitable for ECCs and Over GF(p), 2004.*

Sarma et al, RFID Systems and Security and Privacy Implications, 2003.*

Engels et al; Daniel Engels, Ronald Rivest, Sanjay Sarma, and Stephen Weis Security and privacy aspects of low-cost radio frequency identification systems (International Conference on Security in Pervasive Computing, März 2003).

Engels et al.; Daniel Engels, Sanjay Sarma and Stephen Weis „RFID systems and security and privacy implications (Cryptographic Hardware and Embedded Systems —CHES, Aug. 2003.

Miyako Ohkubo, Koutarou Suzuki and Shingo Kinoshita, „Cryptographic Approach to Privacy-Friendly Tag, (RFID Privacy Workshop. Nov. 2003).

Feldhofer et al.; Martin Feldhofer, Sandra Dominikus, Johannes Wolkerstorfer; "Strong Authentication for RFID Systems using the AES Algorithm", In Proceedings of Workshop of Cryptographic Hardware and Embedded Systems—CHES 2004, LNCS vol. 3156, Springer, pp. 357-370, Boston, USA, Aug. 11-13, 2004.

Klaus Finkenzeller "RFID-Handbuch", 3. aktualisierte und erweiterte Auflage, Carl Hanser Verlag, München, 2002, Kapitel 8 und 9; Klaus Finkenzeller "RFID-Handbuch", 3. aktualisierte und erweiterte Auflage, Carl Hanser Verlag, München, 2002, Kapitel 8 und 9; Book.

Elsayed Mohammed, A. E.Emerah, HK El-Shennawy: "Elliptic Curve Cryptosystems on Smart Cards", Security Technology, 2001 IEEE, 35th International Carnahan Conference on Oct. 2001, pp. 213-222.

Örs S. B. et al., "Hardware Implementation of an Elliptic Curve Processor over GF (p)", Jun. 24, 2003, Application Specific Systems, Architectures and Processors, 2003 Proceedings IEEE International Conference on Jun. 24-26, 2003, Piscataway, JN, USA, pp. 420-430.

Ateniese G. et al., Association for Computing Machinery: "Untraceable RFID Tags via Insubvertible Encryption", Nov. 7, 2005, Proceedings of the 12th ACM Conference on Computer and Communications Security (CCS'05), Alexandria, VA, Nov. 7-1, 2003, New York, NY, pp. 92-101.

German language Japanese Office Action for related Japanese Patent Application No. 2009-529697, issued on Mar. 26, 2012.

German Office Action for related German Patent Application No. 10 2006 060 760.0, issued on Jun. 14, 2012.

Alfred J. Menezes et al., "Handbook of Applied Cryptography," CRC Press LLC, 1991, pp. 397-405.

German language Japanese Office Action for related Japanese Patent Application No. 2009-529697, mailed on Sep. 2, 2011.

* cited by examiner $y^2 = x^3 - 6x + 9$ $y^2 = x^3 - 6x + 3$

FIG 5
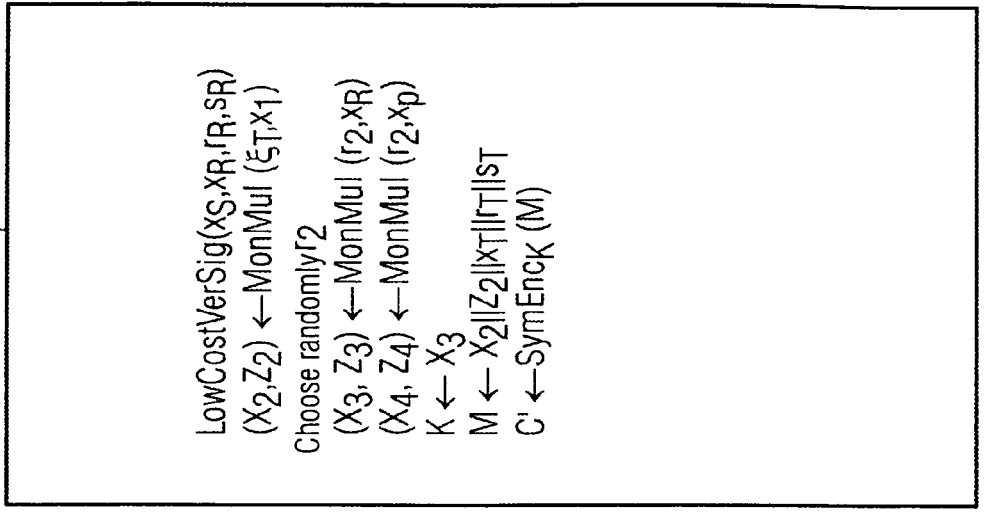
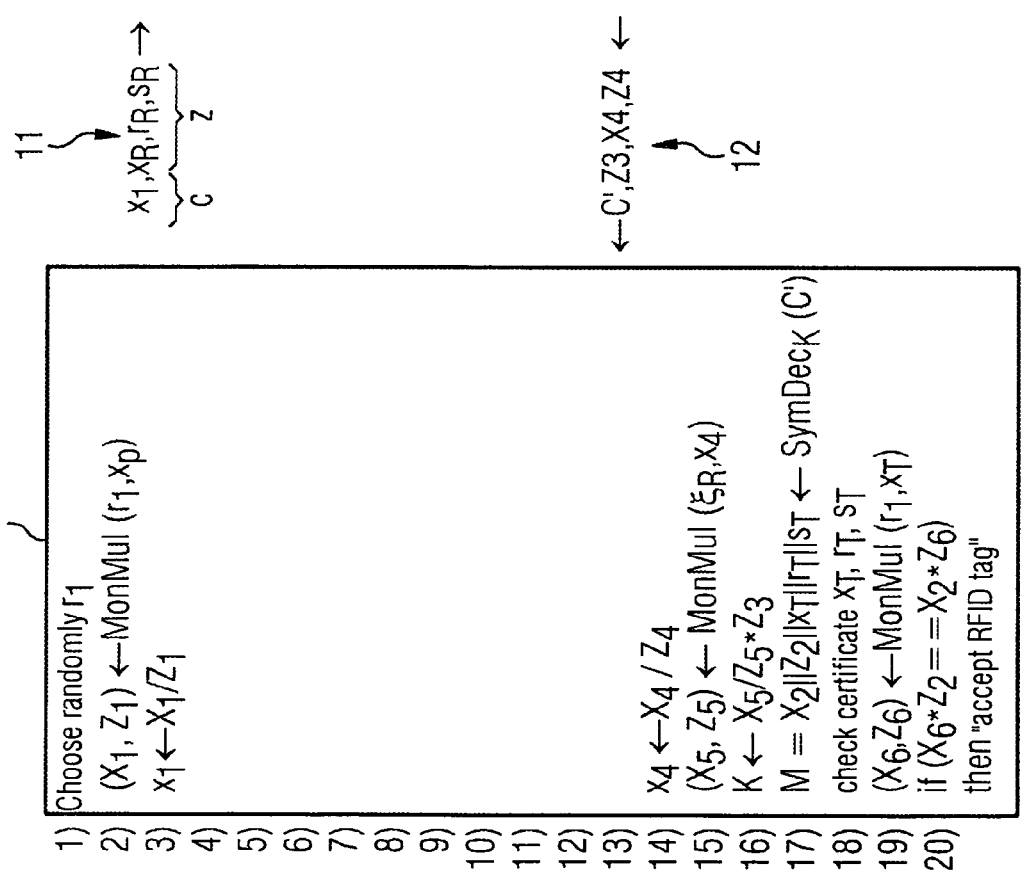

AUTHENTICATION METHOD AND COMMUNICATIONS SYSTEM USED FOR AUTHENTICATION

CROSS REFERENCE TO RELATED APPLICATIONS

This application is based on and hereby claims priority to PCT Application No. PCT/EP2007/060221 filed on Sep. 26, 2007, German Application No. 10 2006 046 215.7 filed on Sep. 29, 2006 and German Application No. 10 2006 060 760.0 filed on Dec. 12, 2006, the contents of which are hereby incorporated by reference.

BACKGROUND OF THE INVENTION

The invention relates to an authentication method and a communication system for authentication.

Identification is performed in the field of transponder technology, and in particular in the field of contactless communication. Although in principle usable in any desired communication systems, the problem area underlying it is explained in what follows by reference to so-called RFID communication systems and their applications. Here, RFID stands for "Radio Frequency Identification". As a general background to this RFID technology, refer to the "RFID-Handbuch" [RFID Manual] by Klaus Finkenzeller, Hansa-Verlag, third updated edition, 2002.

With the RFID systems known nowadays, the passive transponder (or tag) typically accepts an electromagnetic signal emitted by a base station (or read station or reader) from which it extracts the power required in the transponder. In the majority of RFID systems, which use UHF or microwaves, there is, apart from this unidirectional power transmission, also a data communication, which is typically bidirectional, based on a so-called challenge/response method. In this, the base station continually emits inquiry signals (data request, challenge), which will only be answered if there is an appropriate transponder in the effective range of this base station. In this case, a transponder which is within the immediate environment of the base station reacts with an reply signal (response). Only when a complete and valid command has been received does data communication take place between the transponder and the base station. The transponder can now be operated either synchronously or asynchronously with the base station. Such RFID transponders are used, for example, for identifying objects, such as goods, documents and the like.

Unlike conventional wire-based data communications, with this type of data communication the data communication between the base station and a corresponding transponder takes place virtually as a stand-alone activity, and to some extent in the background, with no need at all for a user to be present. I.e. the data communication is started up as soon as an authenticated transponder is within the effective range of the associated base station. Whereas, for example, when a data medium such as a diskette, a USB stick or the like, is being read from, it must be deliberately brought into contact with an appropriate reader, and in the case of wire-based data communication it must also be deliberately initiated by the user. This is not the case for RFID-based data communication.

This has some significant advantages, e.g. for identification in the field of logistics, in warehouses and the like. However, the technology of RFID-based data communications also has some serious disadvantages which must be taken into account for many applications.

One such problem relates to the unauthorized reading out of data contained in an RFID transponder, in particular when this data is security-critical data. For these reasons, an RFID-based data communication system typically also incorporates a security mechanism which, for example, safeguards the data communication by modulating onto the transmitted signal from the base station a security code, which can only be decoded and evaluated by the transponders authorized for the data communication. After successful evaluation, the transponder which is authorized, i.e. authenticated, for the data communication then transmits back to the base station a reply signal, which also contains a security code which can then in turn be evaluated by the base station. Thus, by these security codes a mutual authentication is effected both in the transponder and also in the base station, to avoid an unauthorized user (or hacker) connecting in to the data communication unnoticed, and thus being able to read out security-critical data.

An authentication of this type can be structured to be as demanding as required. However, an important external condition in the case of RFID-based data communication is that the data communication taking place between the base station and transponder should be as simple and as fast as possible. One reason for this is that the transponder typically only has modest resources, i.e. on the one hand low power resources and on the other hand small memory and computational resources, so that the authorization should typically evaluate and authenticate the smallest possible amounts of data. On the other hand, this authentication should also be carried out as quickly as possible because, especially in the case of dynamic RFID-based data communication systems, the transponder which is to be authenticated is very often within the effective range of the base station concerned for a short period of time. Within this short time it is necessary, on the one hand, to establish the data communication link, to authenticate this and then to effect the exchange of data.

With the mass application of RFID-based data communication systems which is to be expected in future, in particular in the commercial environment but also in the private, there is an increased need to make available simple but nonetheless effective measures against impermissible reading out of RFID-based data, to protect the security of a user's data. Here, the following three categories of protection, and hence of security against eavesdropping, are distinguished:

1. Protection of Private Data (Data Privacy):

Ensuring the protection of private data means that an unauthorized user must not be able to infer the identity of a transponder by eavesdropping on the data communication between it and the base station, or alternatively even by actively addressing the transponder. Otherwise this unauthorized user would obtain security-critical, sensitive items of data which are, for example, held in the transponder. Such sensitive items of data could for example contain user-specific information.

2. Protection of the Private Area (Location Privacy):

To ensure location privacy, it is necessary to prevent an unauthorized user being in a position, by eavesdropping on the data communication between the base station and the transponder, or even by some form of active addressing of the transponder at two different points in time, to obtain location-related data about the transponder. So it is necessary to ensure, in particular, that an unauthorized user cannot deduce from this that the transponder in each case is the same, or even possibly different, because otherwise he can deduce so-called movement profiles (tracking) of individual transponders, and hence also of their users. Here again, the information is security-critical and sensitive, and must be protected.

3. Guaranteeing Forward Security:

Finally, it must also be impossible for an unauthorized user to assign any data communication, which was for example recorded between a base station and a transponder some time in the past, to a particular transponder, even if that user should at a later point in time bring to light secret data for this particular transponder.

In order to be able to guarantee the protection just mentioned, or the corresponding security, the reply signals transmitted back from a transponder to a base station when several inquiries are made must appear to an unauthorized user as different and random, even if the base station sends the same inquiry signal several times to the same transponder. For this purpose there are a wide variety of approaches which are intended to guarantee the highest possible security. Some of them are outlined briefly below:

An approach to privacy protection for RFID tags is described in Engels et al., "Security and privacy aspects of low-cost radio frequency identification Systems", International Conference on Security in Pervasive Computing, March 2003 (Engels et al.). With this solution, there is a unique identification code (ID) which is replaced by a random temporary identification number, the META-ID. A transponder replies solely to inquiries which contain the META-ID, whereby only an authorized base station which belongs to the system can deduce the actual identity of the transponder from it. This does indeed give data privacy protection, but not a protection against tracking or against eavesdropping at two different points in time, as applicable, so that here there is also the undesirable possibility of recognizing movement profiles.

Engels et al., "RFID Systems and security and privacy implications", Cryptographic Hardware and Embedded Systems—CHES, August 2003 (Engels et al. 2) describes a method whereby an identification code (ID) is randomized for each transmission. The randomization is here effected with the help of a so-called hash function. However, implementing this hash function on a transponder calls for relatively large hardware capabilities, and thus computational effort. Apart from which, a disadvantage in this case is that the method offers no forward security.

Another method, using a hardware implementation based on AES, is described in Feldhofer et al., "Strong Authentication for RFID Systems Using the AES Algorithm", Workshop on Cryptographic Hardware Embedded Systems—CHES, August 2004 (Feldhofer et al.). This method is a derivative of the so-called three-pass-mutual-authentication protocol in accordance with ISO Standard 9798. This protocol does offer protection against tracking, but no forward security.

Ohkubo et al. "Cryptographic Approach to Privacy-Friendly Tags", RFID Privacy Workshop, November 2003 (Ohkubo et al.) describes a method based on a hash function. Here, a secret item of data $S_1$ on a transponder is replaced by $S_{i+1} = Hash(S_i)$ after each inquiry from a reader. This approach ensures forward security, because it is not possible from a knowledge of the current state $S_i$ to deduce earlier states $S_k$ (where k>i). However, because of the hardware demands this poses and the associated costs, this method is not very suitable in practice for transponders.

For the purpose of securing data communications between a base station and a transponder, data communication is effected by an exchange of cryptographic data. Virtually all the methods known to date, such as for example the methods described above under Engels et al., Engels et al. 2, Feldhofer et al., Ohkubo et al., are based on symmetric cryptography. With such systems, each transponder contains a secret key which is stored in the base station, or to which the base station at least has a secure access, for example in that the secret key is stored in a central secure database.

Apart from the symmetric encryption methods, there also exist so-called asymmetric encryption methods. These asymmetric cryptography methods are based on a private and a public key. In this case, the public key is generated from a private key by a predetermined algorithm. The important feature of these cryptographic encryption methods is that the reverse, that is to say the determination of the private key from the public key, is scarcely feasible within a finite time with the computational capacities which are available.

It has been found to be advantageous to use cryptographic encryption algorithms based on elliptic curves, because these give high security with short key lengths. Such cryptographic encryption methods based on elliptical curves are very efficient, the particular reason for this being that, unlike known cryptographic methods, with these methods there are no known methods of attack with a less than exponential running time. Put another way, this means that the security gain per bit in the security parameter used is higher in the case of methods based on elliptical curves, and hence for practical applications significantly shorter key lengths can be used. Thus cryptographic methods based on elliptical curves perform better and require a smaller bandwidth for transmission of the system parameters than do other cryptographic methods for a comparable level of achievable security.

Hence, cryptographic methods represent a compromise between the level of security which can be expected and the computational effort for encrypting the data. In the German patent application DE 101 61 138 AI it is shown that it is possible to determine the scalar multiple of a point using only the X-coordinate of this point, even without referring to the Y-coordinate. This publication also describes corresponding computational rules for any arbitrary field. These permit significantly more efficient implementations of the point arithmetic, e.g. a Montgomery ladder, for the scalar multiplication, a smaller number of field multiplications per point addition and a smaller number of registers for the point representation of the intermediate results.

SUMMARY

Against this background, one possible objective is to provide a method and a device for the purpose of authentication, for or in a communication system, which on the one hand provides the highest possible security and on the other hand poses the least possible hardware requirements for doing so.

Accordingly, the following is provided:

The inventors propose an authentication method between the participants in a communication system using an asymmetric encryption algorithm based on elliptical curves, with the steps: provision of a first and at least one second participant who have respectively a first and a second secret key, known only to the participants concerned, and with a public key; authentication of an inquiry, transmitted by the first participant, in respect of the validity of a certificate belonging to the first participant and contained in the inquiry; calculation of the reply, from the second participant, associated with the inquiry; using the public key, randomized encryption of the calculated reply and of a second certificate belonging to the second participant; decryption of the reply, transmitted by the second participant, and authentication of it in respect of the validity of the second certificate which it contains.

The inventors also propose a communication system for mutual authentication, using an asymmetric encryption algorithm based on elliptical curves.

The inventors wanted to provide a new type of mutual authentication protocol in accordance with the challenge/response method, by which the base station and the transponder each authenticate the other. This authentication is based on asymmetric cryptography, using elliptical curves. With this authentication method, the data transmitted back to the base station by the transponder is subject to randomized asymmetric encryption. The particular advantage of this is that only the base stations which have a correct, that is authorized, private key are designed with the ability to decrypt the reply data transmitted back by the transponder, and hence to "understand" it. To all other base stations or users, that is those which are not authorized, the reply data transmitted back by the transponder appears to be random. In this way, the protection of the transponder's private area is guaranteed.

The authentication method is based on a new, enhanced security protocol for data communication. This new security protocol is based on a so-called low cost arithmetic for elliptical curves.

Thus the proposed method and system provide an efficient new identification protocol, for the protection of private data (data privacy) and of the private area (location privacy, tracking), and also includes the greatest possible forward security. Also described is the device required for this. The method is based on modern asymmetric cryptography, based on elliptical curves over a finite field of characteristic 2, which has the advantage that its arithmetic can be realized on a very low-cost hardware module and thus is suitable in particular for RFID applications.

Unlike other symmetric authentications methods, the authentication method has the advantage that on the base station side there is no need for the availability of a secure link to a central back-end database, in which to look for a private, secret key for a transponder, which in turn significantly reduces the hardware cost of this implementation.

Unlike a symmetric solution, there is also no danger that there is a base station on which one can get at the so-called master key. Because this would enable the entire secret to be broken, and an unauthorized user could himself produce valid transponders. In the case of the public key solution, only a base station with a correct key can read data out from the corresponding transponders.

The method and system very efficiently prevent an unauthorized user getting to a secret key in the reader or in a transponder, for example via a central database, and thus being able to reproduce base stations, with which he would be in a position to identify transponders belonging to the data communication system or maybe even simply determine their private areas (location privacy and data privacy).

A further important advantage of the authentication method relates to the fact that it is possible in a very simple way to encode different access rights to the transponder from different base stations, in so-called certificates. This means that the certificate concerned contains data about whether a base station has, for example, only rights to read from the transponder concerned or has in addition the rights to write to it.

With the authentication method, a two-sided authentication protocol is used, whereby a first participant, e.g. a base station, and a second participant, e.g. a transponder, each authenticate the other. The method uses an asymmetric cryptography based on elliptic curves. Unlike other methods, this cryptographic method has the advantage that the number of bits required for the authentication is substantially shorter than with other methods, so that the bandwidth is less. In connection with antenna receivers, such as are used in transponders, this is a substantial advantage.

BRIEF DESCRIPTION OF THE DRAWINGS

These and other objects and advantages of the present invention will become more apparent and more readily appreciated from the following description of the preferred embodiments, taken in conjunction with the accompanying drawings of which:

FIG. 5 a flow diagram to illustrate the authentication method based on elliptical curves.

DETAILED DESCRIPTION OF THE PREFERRED EMBODIMENT

Figure 1A:
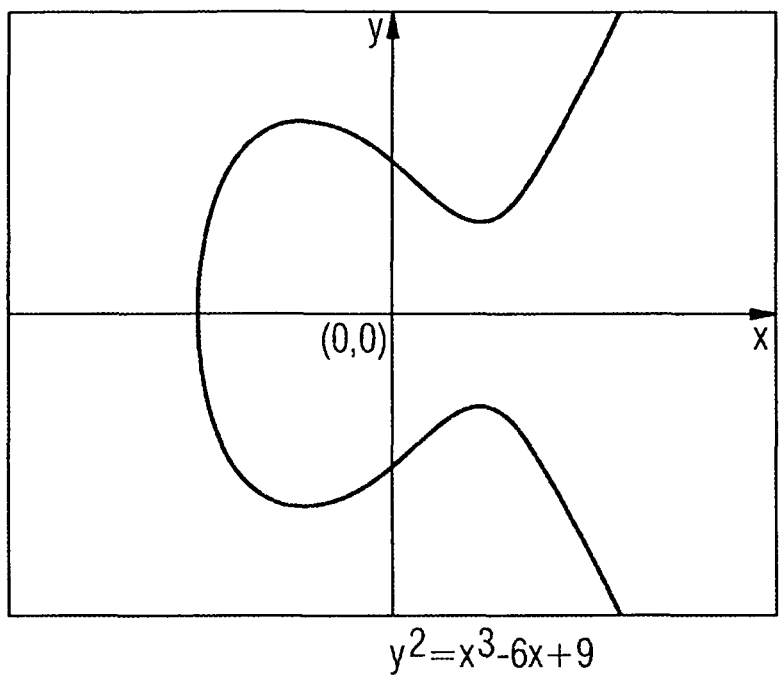
FIG. 1a, 1b examples of an elliptic curve.

Reference will now be made in detail to the preferred embodiments of the present invention, examples of which are illustrated in the accompanying drawings, wherein like reference numerals refer to like elements throughout.

The proposed authentication method has a new security protocol, which is based on an arithmetic for elliptical curves. Before describing the authentication method, therefore, the most important characteristics of elliptical curves are first explained by reference to FIGS. 1a and 1b.

An elliptical curve over a finite field (Galois field) $GF(2^d)$ is the set of zero points for the cubic equation $$y^2 + xy = x^3 + ax^2 + b \qquad (1)$$

where x and y are variables and the coefficients a and b with $b \neq 0$ are coefficients in the Galois field $GF(2^d)$.

Figure 1B:
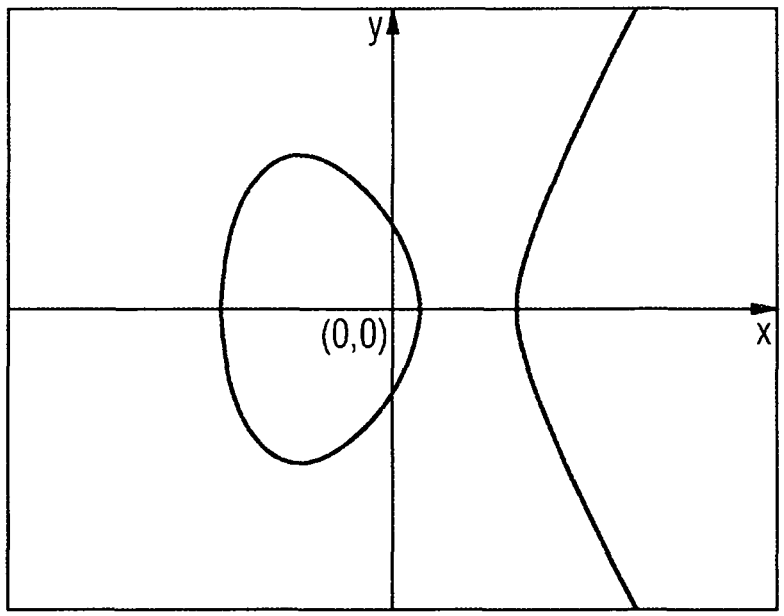

In FIG. 1a and FIG. 1b, two elliptical curves over the real numbers are shown by way of example.

Figure 2:
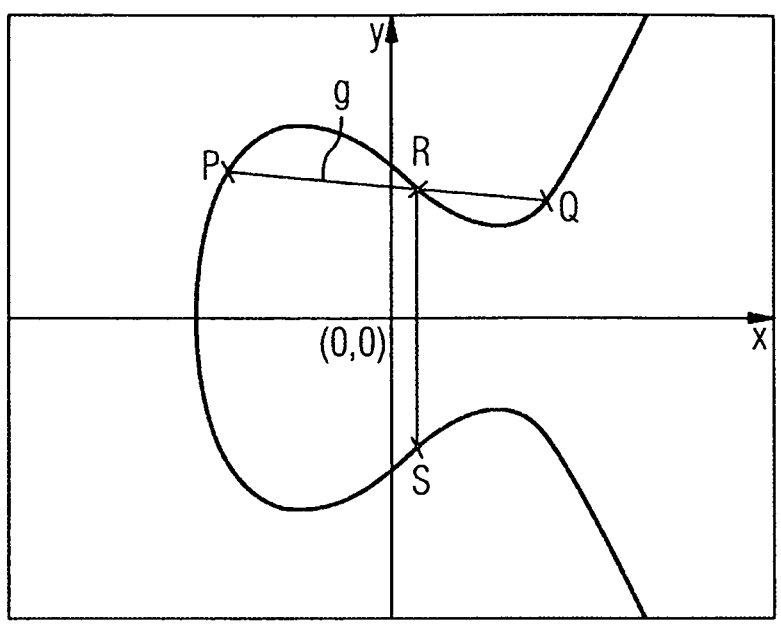
FIG. 2 an example of an addition making use of an elliptic curve.

With the addition of a point at infinity as a neutral element, this set of zero points forms an additive group, for which the group law can be interpreted geometrically, at least in the case of elliptical curves over the real field. Such an additive group has a set of numbers and an addition (group operation). Apart from this, there exists in this group a neutral element which, when added to a number from the set of numbers, does not alter its value (for example, zero). Further, there exists for each value in the set of numbers an inverse element, such that the result of adding the value to its corresponding inverse element is the neutral element. Two results from algebraic geometry are important here (see FIG. 2):
Every straight line intersects an elliptical curve at three points, not necessarily different from each other. For every two points, which are not necessarily different, it is possible to calculate a third point, so that the sum of the three points represents the neutral element. If P and Q (with $P \neq -Q$) are two points and g the straight line through these points P, Q, then this straight line g intersects the elliptical curve at a third point R. By reflecting R in the X-axis, one obtains S=P+Q. For the case that P=−Q, the gradient of g is infinite and the third intersection point R is the point at infinity.

Scalar multiplication on elliptical curves is defined in a way analogous to the definition of scalar multiplication in vector spaces. Let P be a point on an elliptical curve and k a natural number. The scalar multiplication, k*P, corresponds to a k-fold addition of P to itself. This scalar multiplication k*P forms the essential building block in crypto-graphic systems based on elliptical curves. For cryptographically strong elliptical curves, scalar multiplication represents a one-way function, i.e. it can be calculated in a poly-nominal time but can only be inverted in an exponential time. An efficient algorithmic reconstruction of the scalar is therefore difficult to imagine. This one-way function forms the basis for cryptographic authentication methods based on elliptical curves.

One known method for implementing such scalar multiplications on the basis of elliptical curves is the so-called Montgomery ladder. The Montgomery ladder can be implemented in such a form that the calculation of the X-coordinate of a scalar multiple of a point P uses only the X-coordinate of P and exclusively additions and multiplications in the Galois field $GF(2^d)$. No demanding inversions are necessary here.

The precise algorithm of the Montgomery ladder, called by $$(X_{kP}, Z_{kP}) \leftarrow \text{MonMul}(k, x_P),$$

reads as follows:
Input Parameters:

a scalar $k = (k_{n-1}, \ldots, k_0)$ in binary format, the x-coordinate $x_P$ of the point $P$.

Output Parameters:
coordinates (X,Z) of the point k*P, so that X/Z represents the affine x-coordinate. The following shows the method of the Montgomery ladder algorithm (in the (++) programming language:

| | |
|---|---|
| 1) | $X_1 \leftarrow 1, Z_1 \leftarrow 0, X_2 \leftarrow x_P, Z_2 \leftarrow 1$ |
| 2) | for i ← n−1 to 0 do |
| 3) | If $k_i = 1$ then |
| | { $T \leftarrow Z_1, Z_1 \leftarrow (X_1 Z_2 + X_2 Z_1)^2, X_1 \leftarrow x_p Z_1$ |
| | $+ X_1 X_2 T Z_2,$ |
| 4) | $T \leftarrow X_2, X_2 \leftarrow X_2^4 + b Z_2^4,$ |
| | $Z_2 \leftarrow T^2 Z_2^2$ } |
| 5) | else { $T \leftarrow Z_2, Z_2 \leftarrow$ |
| | $(X_2 Z_1 + X_1 Z_2)^2, X_2 \leftarrow x_p Z_2$ |
| | $+ X_2 X_1 T Z_1$ |
| 6) | $T \leftarrow X_1, X_1 \leftarrow X_1^2 + b Z_1^4,$ |
| | $Z_1 \leftarrow T^2 Z_1^2$ } |
| 7) | return $(X_1, Z_1)$ |

The additions and multiplications set out above can be carried out in the Galois field $GF(2^d)$ with a relatively small hardware requirement. The corresponding transponder, and also the base station, here require only simple and low-cost processors for carrying out these computational operations. Using a feedback shift register, which represents the main component of this processor, a multiplication can be performed in d cycles, and indeed an addition can be realized in a single cycle.

The Montgomery algorithm described above effects an efficient calculation of the scalar multiplication, which can be executed in conjunction with the shift register.

The mutual authentication method, described below, is based on this Montgomery algorithm. The protocol of the authentication method is an enhancement of a one-sided authentication, in which a transponder initially authenticates itself to a base station by the familiar challenge/response method. The authentication method offers in addition the greatest possible protection of the transponder's private area, and forward security.

Before the two-sided authentication method is described, the principle of the structure of a communication system proposed by the inventors is first explained in more detail below, by reference to the block diagram in FIG. 3.

Figure 3:
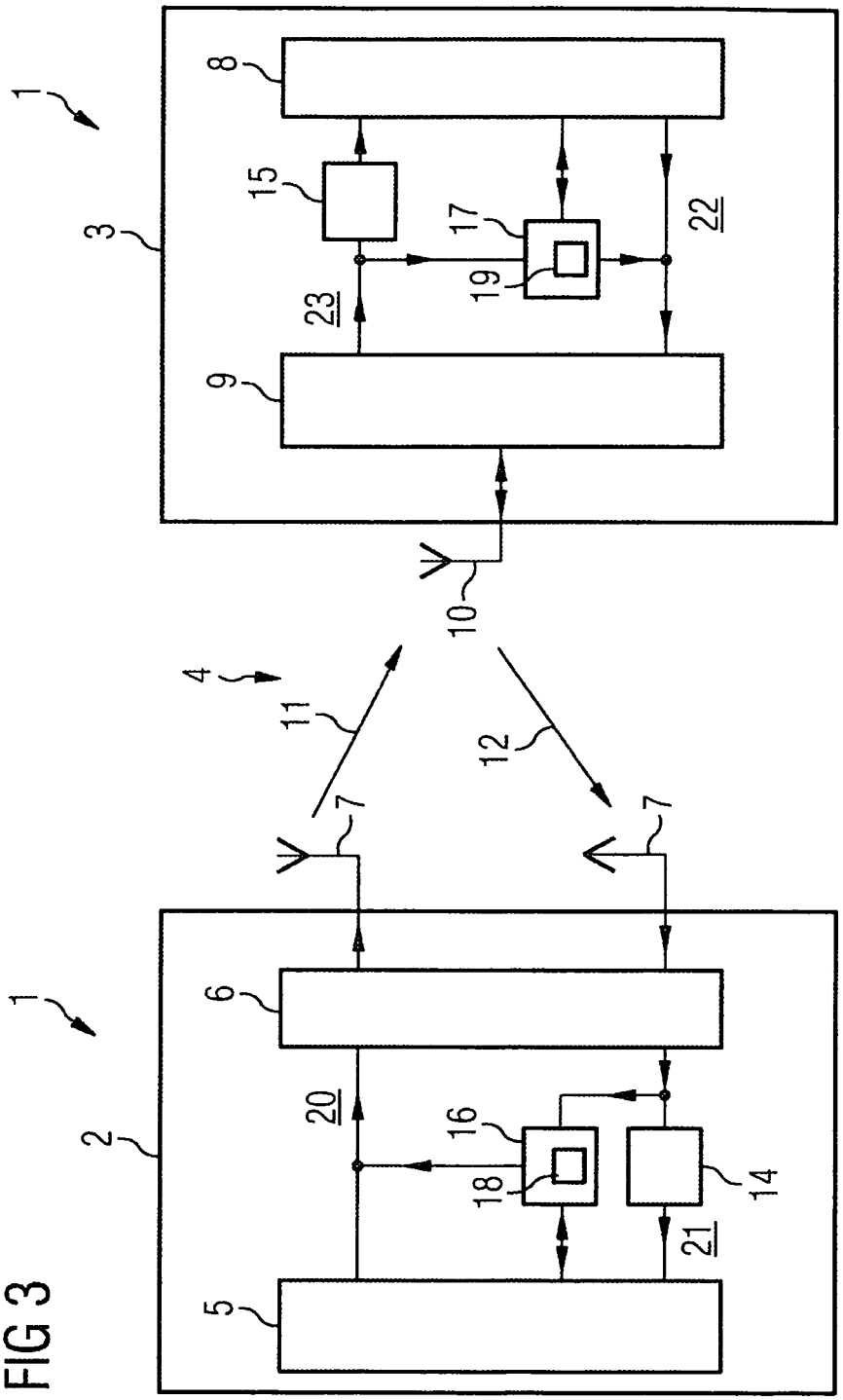
FIG. 3 by reference to a block diagram, the structure of a communication system proposed by the inventors.

In FIG. 3 the reference mark 1 identifies a communication system, for example an RFID communication system. The RFID communication system 1 contains a first participant (base station 2) and a transponder 3. The base station 2 and a second participant (transponder 3) have a bidirectional communication connection via a wireless communication link 4. The communication system 1 can take the form, for example, of a so-called master-slave communication system, where the base station 2 acts, for example, as the master and the transponder(s) 3 each act, for example, as a slave.

The base station 2 incorporates a control device 5, a transmit/receive device 6 together with a transmit/receive antenna 7. In the same way, the transponder also incorporates a control device 8, a transmit/receive device 9 together with a shared transmit/receive antenna 10.

The transmit/receive antennas 7, 10 can be in the form of inductive helix antennas or equally of dipole antennas.

The sequence of activities for the data communication is controlled in the relevant control devices 5, 8. Typically, the control device contains a computing device (processor, CPU or the like), in which the computational operations, in particular for the authentication, are performed.

Control of the data communication is in each case affected by the control device 5 on the base station side and the control device 8 on the transponder side. The control device 5 in the base station 2 is designed to transmit high-frequency carrier signals 11 via the antenna 7 to the antenna 10 of the transponder 3. In the same way, the control device 8 and the transmit/receive device 9 of the transponder 3 are designed to transmit back to the base station 2 an appropriate reply signal 12 to the carrier signal 11 which was transmitted. The control devices 5, 8 can, for example, be implemented in the form of program-controlled devices, such as for example a microcontroller or microprocessor, or even as a hardwired logic circuit, for example in the form of an FPGA or PLD.

The memories 18, 19 typically contain a RAM memory in which for example computational results are stored. In addition, or as an alternative, these memories 18, 19 can also have an EEPROM memory in which are held system parameters, parameters for the various communication participants such as for example a private key specific to a participant, a public key, a certificate specific to a participant, or suchlike.

In addition, the base station 2 has an evaluation device 14. This evaluation device 14 is arranged in the receiving path of the base station 2, and arranged downstream from the receiver in the transmit/receive device 6. In the same way, the transponder 3 also has an evaluation device 15 in the receiving path 23 of the transponder 3. The evaluation of the data received in a data communication is carried out in the evaluation unit concerned, 14, 15. In particular, an initial demodulation and decoding of the received data is undertaken there.

Both the base station 2 and also the transponder 3 now have an authentication module 16, 17, which is arranged between the relevant transmit/receive device 6, 9 and control device 5, 8 in the base station 2 and the transponder 3 respectively. These authentication modules 16, 17 are here in the form of separate modules. However, the authentication module 16, 17 will preferably be a component of the relevant control device 5, 8.

The authentication module 16, 17 has in addition a memory 18, 19 in which are held, for example, data, keys or suchlike, which are required for the authentication or must be stored temporarily.

The basic principle of the authentication method (or authentication protocol) is explained below by reference to the schematic diagram in FIG. 4.

Figure 4:
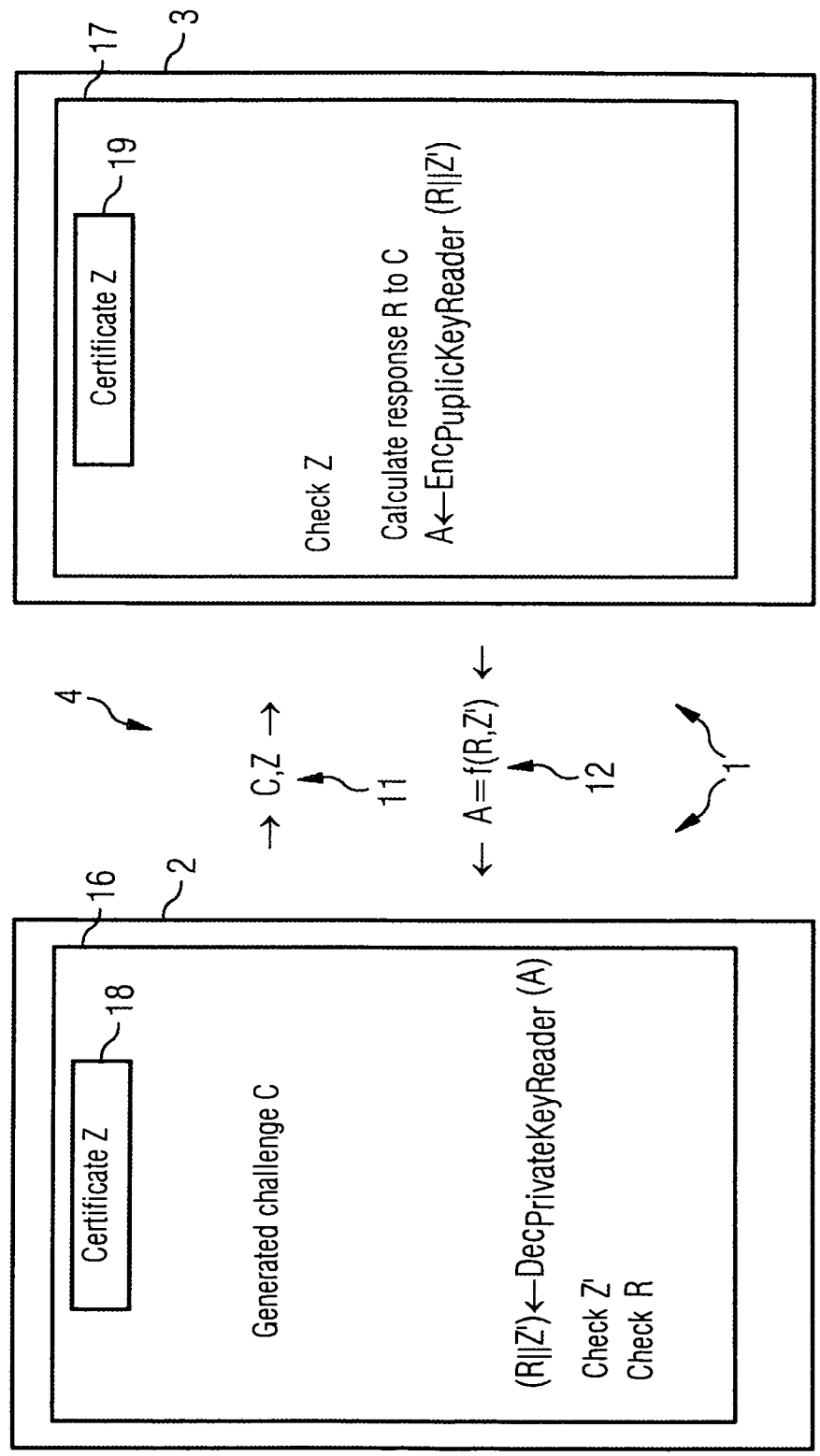
FIG. 4 a block diagram, which illustrates the principle of the proposed authentication method.

FIG. 4 shows in purely schematic form the base station 2 and the transponder 3 of the communication systems 1, where for the purpose of explaining the authentication method only the authentication modules 16, 17 within these devices 2, 3 are shown there. Assume that in the storage device 18 on the base station side, the certificate Z and the secret key of the base station 2 for the base station side are stored, and in the storage device 19 of the transponder 3 are stored a different certificate Z' together with the secret key for the transponder side.

The authentication method takes place as follows:

At the start of the authentication method, the authentication module 16 on the base station side generates an inquiry C (C=challenge).

The authentication module 16 radiates this inquiry C, together with the certificate Z which is stored on the base station side, as an inquiry signal 11. One or more transponders 3 which are in the immediate neighborhood of this base station 2 accept this inquiry signal 11 with the certificate Z and the inquiry C, with this inquiry signal 11 being demodulated and decoded in the transponder 3 concerned in the familiar way.

The authentication module 17 in the transponder 2 then checks the validity of the certificate Z which it has received. The authentication module 17 then calculates the appropriate reply R (R=response) to the inquiry C.

The authentication module 17 then transmits the reply R, together with the transponder-specific certificate Z' held in the memory 19 of the transponder 3, back to the base station 2 as the reply signal. The important point about this is that the data transmitted back by the transponder 3, that is the reply R and the certificate Z', is randomly encrypted by the authentication module 19 beforehand, so that it is this randomly and asymmetrically encrypted data A=f(R, Z') which is transmitted to the base station 2. The encryption (Enc) is here effected using a public key (PublicKeyReader) for the base station 2 which is, for example, contained in the certificate Z transmitted by the base station 2.

In the base station 2, and in particular in its authentication module 16, the reply signal 12 which is received, which contains this randomly and asymmetrically encrypted data A=f (R, Z'), is decrypted using a private key (PrivateKeyReader), so that at this point both the reply R and the certificate Z' are available in the authentication module 16.

The authentication module 16 checks the decrypted certificate Z' together with the reply R. If the check on these data items R, Z' is positive, the transponder 3 is authenticated to the base station 2, so that the actual data communication between the base station 2 and the transponder 3 can take place after this.

It is important for the feasibility of this mutual authentication protocol that the base station generates the inquiry C independently of the secret key (certificate Z') stored in the transponder 3. Otherwise, an additional communication step would be required, to enable the transponder 3 first to communicate to the base station 2 its identity or its public key. The result is that overall the authentication method is shorter.

A further important point is that the generation of the inquiry C and the reply R, together with the appropriate certificates Z, Z', are so defined that it is possible to carry out the corresponding authentication protocol based on elliptical curves over the Galois field $GF(2^d)$. Unlike the mutual asymmetric authentication methods known to date, this provides additional protection of the private area of whichever transponder 3 is being addressed.

The authentication protocol described above by reference to FIG. 4 has the following characteristics:

Authentication:

The transponder 3 authenticates itself to the base station 2 in that it replies to the inquiry C transmitted by the base station 2 by transmitting back to the latter a valid certificate Z', together with a valid reply R. The transponder 3 can only calculate and transmit back such a valid reply R if it has a knowledge of the transponder's secret key $\xi_T$, which corresponds to the public key $x_T$ in the certificate Z'.

Privacy Protection for the Transponder:

The data A which is transmitted back by the transponder 3 can only be decrypted, and hence also interpreted, by a base station 2 which belongs to the communication system 1 which is associated with the transponder 3, that is, one which transmits a valid certificate Z and at the same time has the secret key $\xi_R$ which matches the public key $x_R$ in the certificate Z. To all the other base stations 2, these items of data for the transponder 3 look random. This ensures the data security (data privacy) for the transponder 3 concerned.

In addition, a new random key K is selected for each inquiry C from the base station 2 to the transponder 3. Hence the data A transmitted back by the transponder 3 is different for each inquiry from the base station 2, even if there are repeated identical inquiries. An unauthorized user would in this case detect different inquiry data and reply data each time, and would therefore be unable to establish any form of links between the items of inquiry data and the corresponding reply data, transmitted at different points in time from the one and same transponder 3 to the base station 2. This permits the greatest possible protection against undesirable so-called tracking (location privacy).

Forward Security:

If the authentication protocol is re-executed (new instance), the transponder 3 reselects the key K randomly and uses it to encrypt its certificate Z' together with the corresponding reply R, which depends on the secret key $\xi_T$ on the transponder side, so that an unauthorized user is not even in a position to assign previously recorded instances of this authentication protocol to the transponder 3 concerned. To do so he would need to know the key K in each case, but this is discarded again by the transponder 3 after each instance of the authentication protocol, and is not stored on the transponder 3 itself. The only secret which an unauthorized user could bring to light, for example by breaking open and analysing the transponder 3, is the secret key $\xi_T$. However, this secret key $\xi_T$ has no effect on the key K. If the unauthorized user were to know the secret key $\xi_T$, then the transponder would no longer have its authenticity, so that data communication could then no longer be effected from this transponder 3 to the base station 2. This is a further security aspect of the overall authentication method.

In sum, this makes possible the greatest possible security for the data communication, both in respect of the authentication and also in respect of forward security and data security (privacy protection), using relatively limited resources.

An example of the authentication method, based on elliptical curves, is described below by reference to the flow diagram in FIG. 5.

For the authentication, the following parameters are specified for the communication system 1, the base station 2 and the transponder 3:

As system parameters, that is as parameters which apply for the entire communication system 1 and hence for the entire authentication, the following parameters are specified: a suitable elliptical curve is specified;

$x_p$ is the affine x-coordinate of the base point P;

$x_s$ is a public key for signature verification.

The following parameters apply solely for base station 2:

$\xi_R$ is the secret key on the base station side;

$x_R, r_R, s_R$ represent the certificate Z, where $x_R$ is the public key (affine x-coordinate of the point $R=\xi_R*P$) and $r_R, s_R$ are the ECGDSA signature of $x_R$, verifiable using the public key $x_s$.

The following parameters apply solely for the transponder 3:

ξT is the secret key on the transponder side;

xT, rT, sT represent the certificate Z', where xT is the public key (affine x-coordinate of the point T=ξT*P) and rT,sT are the signature of xT, verifiable using the public key xs.

The authentication method, shown by way of example in FIG. 5, is carried out as follows:

In steps 1) to 4) of the authentication protocol shown in FIG. 5, the base station generates the inquiry C=$x_1$. This inquiry $x_1$ represents the x-co-ordinate of the point $P_1$=$r_1$*P for a random scalar. The base station 3 transmits to the transponder 3 this inquiry $x_1$ together with the certificate Z=[$x_R$, $r_R$, $s_R$] for the base station 3, which includes a public key $x_R$ for the base station 2 and the signature components $r_R$, $s_R$.

In step 5), a signature check is carried out. In this signature check, the transponder 3 checks the validity of the certificate Z of the base station 2. The key $x_R$ is regarded by the base station 3 as authentic if the certificate Z is valid. The signature check can be carried out, for example, using a so-called "low-cost signature algorithm", such as is described in the German patent application DE 101 61 137 AI. In respect of the method of signature checking, the entire content of this publication is included in with the present patent application.

In the case of this signature check, three scalar multiplications are performed: (XA,ZA)←MonMul(rR,rR), (XB,ZB)←MonMul(sR,xS), (XC,ZC)←MonMul(xR,xP). Only if the equation $$X^2{}_C(X_A Z_B + X_B Z_B)^2 + X_A X_B X_C Z_A Z_B Z_C + X^2{}_A X^2{}_B X^2{}_C + b Z^2{}_A Z^2{}_B Z^2{}_C = 0 \qquad (2)$$

is true is the certificate Z verified as valid. Equation (2) can be very simply evaluated by 11 multiplications in the Galois field $GF(2^d)$.

In the event that the certificate Z is regarded as invalid, the transponder 3 rejects the base station 2 which transmitted the certificate Z as being non-authentic, and thus invalid. In this case, no further data communication takes place.

In step 6), a reply is calculated. Here, the transponder 3 calculates for the inquiry $x_1$ the appropriate reply ($X_2$,$Z_2$), which represents the projective x-coordinate of the point $P_2$=ξ$_T$*$P_1$=ξ$R_T$*($r_1$*P).

Following this, in steps 7) to 10), the randomized key is generated in the transponder 3. Here, the transponder 3 generates a symmetric key K=$X_3$, which represents the projective x-coordinate of the point $P_3$=$r_2$*R=$r_2$*(ξ$_R$*P). In this, $r_2$ is a random scalar. The projective x-coordinate ($X_4$,$Z_4$) of a point $P_4$, together with the component $Z_3$, is used by the base station 2 in calculating the symmetric key K.

In steps 11) and 12), the transponder 3 encrypts the reply ($X_2$,$Z_2$) together with its certificate Z' for the transponder 3. Here, the certificate Z' includes the public key $x_T$ for the transponder 3 and the signature components $r_T$ and $s_T$. The first part of this, in step 11), is to arrange the data ($X_2$,$Z_2$) and the certificate Z' one after the other. Then the actual encryption takes place, in step 12), whereby use can be made of any arbitrary encryption method, which is here not more closely specified.

In order to obtain the encrypted reply data C' use is made, for example, of symmetric encryption. The facility for symmetric encryption can, for example, be based on a linear shift register, which is already integrated into the transponder 3 for the $GF(2^d)$ arithmetic. With little additional hardware it is possible to carry out the encryption using this shift register.

In a variant of steps 11) and 12), the transponder 3 calculates the key K=$x_3$=$X_3$/$Z_3$ and $x_4$=$X_4$/$Z_4$ and instead of $Z_3$, $X_4$, $Z_4$ transmits only the value $x_4$, if it is possible to effect an inversion in $GF(2^d)$ on the transponder 3 and if the transmission of a d-bit long value takes longer than an inversion.

After this, in step 13), the encrypted reply data C', together with the data items ($X_4$,$Z_4$), $Z_3$, are transmitted back to the base station 2. The reply data C' contains the useful data, whereas the data items ($X_4$,$Z_4$), $Z_3$, are supplementary components, which form part of the randomized message.

In steps 14)-16), the symmetric key K is calculated in the base station 2 from the data items $Z_3$, $X_4$, $Z_4$. The important point here is that only the base station 2, which knows the secret key ξ$_R$, is in a position to retrieve the relevant symmetric key K from $Z_3$, $X_4$, $Z_4$.

With the variant cited above, the base station calculates the key from K=$X_5$/$Z_5$.

In step 17), the base station 2 decrypts the reply ($X_2$,$Z_2$) and the certificate $x_T$, $r_T$, $S_T$ of the transponder 3. A so-called El-Gamal encryption/decryption method can be used here, for example. This method is a so-called public key method, which is designed to effect randomized encryption and decryption.

The base station 2 checks the certificate Z' of the transponder 3 in step 18). If the certificate Z' is invalid, then the base station 2 rejects the transponder 3 as non-authentic.

In a variant, the transponder 3 and the base station 2 can have different signature methods or different public keys, as applicable, for their relevant certificates.

In steps 19)-20), the base station 2 checks the reply from the transponder 3. The base station 2 calculates the projective x-coordinate ($X_6$,$Z_6$) of the point $P_6$=$r_1$*T=$r_1$*(ξ$_T$*P) and in doing so checks whether ($X_2$,$Z_2$) and ($X_6$,$Z_6$) could be projective coordinates of the same point. This will be precisely so if it is true that $X_6 Z_2$=$X_2 Z_6$. If the reply is correct, then the transponder 3 is authentic. If the reply is false, then the base station 2 will reject the transponder 3 as non-authentic.

The preferred protocol permits of a very simple but nonetheless very secure authentication, the greatest possible privacy protection (data and location privacy) and offers in addition the greatest possible forward security.

The method for securely authenticating a transponder to a base station, with additional privacy protection for the transponder, is based on public key cryptography and as a result has the decisive advantage, compared to previous symmetrical solutions, that on the base station side there is no need for the existence of a secure link to a central back-end database, in which to search for a transponder's key. Consequently, no base station needs to have a secret key which is the same throughout the system. With the known symmetrical solution, if one were to "compromise" a base station, and if one could get at its master key, then the entire system would be broken, and one could oneself produce "valid" transponders. In accordance with the proposed method, this cannot happen. In the case of the public key solution, no base station has a key which an unauthorized user could use to create "valid" transponders.

A further important advantage of the asymmetric variant relates to the fact that one can very simply encode in the certificates different access rights to the transponders from different authorized base stations, i.e. the certificate then contains details of whether a base station has the right, for example, only to read from the transponder, or also has the right to write to it.

As a variant, in the situation where all the base stations have the same rights, one could give each base station the same secret key and correspondingly give the transponders the associated public key, which would have the advantage that it would not be necessary on the transponders to carry out a certificate check on a reader's certificate. This would approximately halve the computational effort which the transponders need to provide.

Although the foregoing has been described mainly by reference to a preferred exemplary embodiment, it is not restricted to the latter, but can be modified in diverse ways.

Thus the method and system are, in particular, not restricted exclusively to RFID systems, but could also for example be extended to the recognition of individual parts (item identification). Such parts often do not need to be uniquely recognized, Here too, it is often sufficient that the presence, for example, of a faulty part can be excluded. This is generally also referred to as non-unique identification. When the transponder is operating in this context, it has the function of a sensor. So the method also relates expressly to such sensors, by which communication is undertaken for the purpose of reading out and writing data in a data medium or sensor.

The method also relates to any arbitrary data communication systems, which are not necessarily RFID systems and which are also not necessarily in wireless form.

In FIGS. 3 and 4, the structure of the RFID system, and in particular the transponder and the base station, has deliberately been shown in greatly simplified form, for clarity. It goes without saying that the base station and the corresponding transponder also incorporate the functional units which are necessary for data communication between the base station and the transponder, such as a demodulator, modulator, power supply, synchronization device, decoder and the like.

In FIGS. 3 and 4, the control device, the evaluation device and the authentication module have each been shown as distinct. It goes without saying that these devices can be, for example, in the form of components of the control device or can also be separate from it. It should also be pointed out that both the base station and also the transponder can have a single transmit/receive device and an associated transmit/receive antenna. It is also certainly conceivable for the base station and/or the transponder to have separate transmit/receive devices, and in particular a transmit antenna and a separate receive antenna.

The data communication system and data communication method described above have been described with reference to the "reader-talks-first" principle. The "tag-talks-first" principle is of course also conceivable, in which case the base station initially waits for an inquiry from a transponder. However, this second-named principle has a worse response time so that, especially in modern so-called "long-range" data communication systems, such as are used for example with RFID, it is preferable to use the "reader-talks-first" principle.

It goes without saying that the method of authentication described by reference to FIG. 5 is to be understood as merely an example. The individual parts of the method and the mathematical operations applied could also be varied and modified within the ambit of the invention, for example by a functionally equivalent or alternative method.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in *Superguide v. DIRECTV*, 69 USPQ2d 1865 (Fed. Cir. 2004).

The invention claimed is:

1. A method for authenticating communication between participants in a communication system, comprising:
  causing one or more processors to execute:
    providing a public key to at least a first participant and a second participant, the first and second participants respectively having first and second secret keys, known only to the participant concerned;
    authenticating an inquiry, transmitted by the first participant, the inquiry containing a first certificate belonging to the first participant, the inquiry being authenticated by checking validity of the first certificate;
    calculating a reply at the second participant appropriate to the inquiry, the reply containing a second certificate belonging to the second participant;
    performing randomized encryption of the calculated reply and the second certificate, using the public key;
    decrypting and authenticating the calculated reply, transmitted by the second participant, the calculated reply being authenticated by checking validity of the second certificate, wherein
  the first participant comprises a first processor, and
  the second participant comprises a second processor.

2. The method as claimed in claim 1, wherein each secret key has an associated public key.

3. The method as claimed in claim 2, wherein the public key is contained in the first certificate and is determined by the second participant from the first certificate for the first participant.

4. The method as claimed in claim 1, wherein
  the first and second participants engage in data communication using a challenge/response method,
  the inquiry is transmitted from first participant to the second participant and contains items of inquiry data as a challenge, and
  the reply is transmitted from the second participant to the first participant and contains items of reply data as a response to the challenge.

5. The method as claimed in claim 4, wherein in decrypting and authenticating the reply, the reply data is checked.

6. The method as claimed in claim 1, wherein the inquiry from the first participant is independent of the second certificate for the second participant.

7. The method as claimed in claim 1, wherein
  system parameters are provided for the communication system, and
  the system parameters comprise an elliptical curve suitable for cryptographic methods, an affine x-coordinate of a base point, and a public key for signature checking.

8. The method as claimed in claim 1, wherein
  first participant parameters are provided for the first participant, and
  the first participant parameters comprise the first secret key and the first certificate.

9. The method as claimed in claim 1, wherein
  second participant parameters are provided for the second participant, and
  the second participant parameters comprise the second secret key and the second certificate.

10. The method as claimed in claim 1, wherein
  in authenticating the inquiry, a signature check is performed, and
  the signature check checks validity of the first certificate using the public key.

11. The method as claimed in claim 1, wherein in performing randomized encryption of the calculated reply, a symmetric key is generated randomly, and
  randomized encryption is carried out using a symmetric encryption method.

12. The method as claimed in claim 1, wherein before performing randomized encryption of the calculated reply, the calculated reply and the second certificate are arranged one after another by concatenation.

13. The method as claimed in claim 11, wherein in decrypting and authenticating the calculated reply, the first participant calculates the symmetric key, from data transmitted by the second participant, using the first secret key.

14. The method as claimed in claim 13, wherein
in decrypting and authenticating the calculated reply, the first participant decrypts the calculated reply and the second certificate for the second participant, using the calculated symmetrical key.

15. The method as claimed in claim 13,
wherein in decrypting and authenticating the calculated reply, the second certificate and the calculated reply are checked for authenticity.

16. The method as claimed in claim 1,
wherein encryption is performed based on scalar multiplications over an elliptical curve.

17. The method as claimed in claim 16, wherein
the scalar multiplications are performed using a Montgomery algorithm.

18. The method as claimed in claim 16,
wherein scalar multiplications are performed using a shift register which performs multiplication and/or addition cyclically.

19. A communication system for communication between at least first and second participants with mutual authentication, both the first and second participants being provided with a public key, the first and second participants respectively having first and second secret keys, known only to the participant concerned, the system comprising:
an authentication module provided in the first participant to generate an inquiry containing a first certificate belonging to the first participant
a transmitter provided in the first participant to transmit the inquiry to the second participant;
an authentication module provided in the second participant to authenticate the inquiry, to calculate a reply to the inquiry and to encrypt the reply, the inquiry being authenticated by checking validity of the first certificate, the reply containing a second certificate belonging to the second participant, the reply being encrypted with randomized encryption of the reply and the second certificate, using the public key; and
a transmitter provided in the second participant to transmit the encrypted reply to the first participant, wherein
the authentication module provided in the first participant decrypts and authenticates the reply, the reply being authenticated by checking validity of the second certificate,
wherein
the first participant comprises a first processor, and
the second participant comprises a second processor.

20. The system as claimed in claim 19, wherein
each authentication module has a computational device to perform calculations, checks and authentications.

21. The system as claimed in claim 19, wherein each authentication module has an encryption/decryption device for encryption and/or decryption.

22. The system as claimed in claim 19, wherein each participant has a memory that hold system parameters together with parameters associated with the respective participant.

23. The system as claimed in claim 19, wherein
the first and second participants both function as transceivers, and
the transceiver communicate over a radio frequency ID (RFID) communication link in an RFID communication system.

24. The system as claimed in claim 19, wherein the first participant is a radio frequency ID (RFID) base station and the second participant is an.

* * * * *

UNITED STATES PATENT AND TRADEMARK OFFICE
CERTIFICATE OF CORRECTION

PATENT NO. : 8,458,472 B2  Page 1 of 1
APPLICATION NO. : 12/311440
DATED : June 4, 2013
INVENTOR(S) : Michael Braun et al.

It is certified that error appears in the above-identified patent and that said Letters Patent is hereby corrected as shown below:

In the Claims:

Column 16, Line 33, In Claim 24, delete "an." and insert -- an RFID transponder. --, therefor.

Signed and Sealed this
Tenth Day of September, 2013

Teresa Stanek Rea
*Acting Director of the United States Patent and Trademark Office*